UNITED STATES PATENT OFFICE.

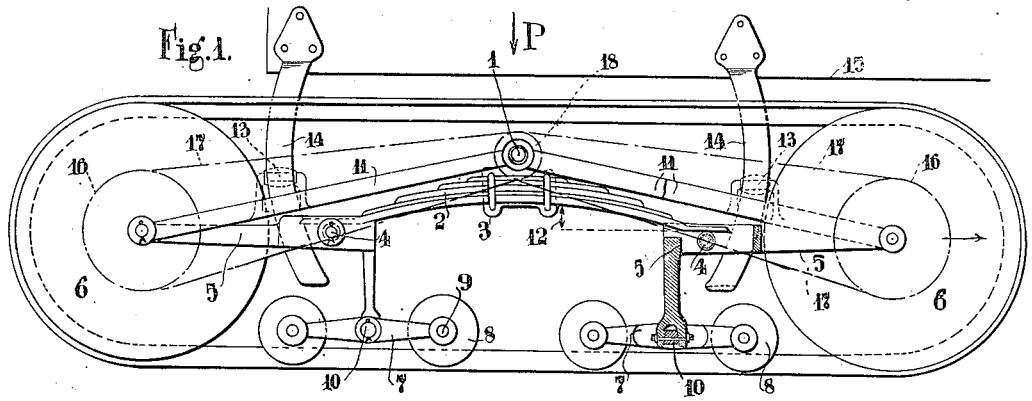

ADOLPHE KÉGRESSE, OF CZARSKOIE SELO, RUSSIA.

AUTOMOBILE-SLEIGH SUSPENSION.

1,392,688. Specification of Letters Patent. Patented Oct. 4, 1921.

Application filed March 21, 1916. Serial No. 85,574.

(GRANTED UNDER THE PROVISIONS OF THE ACT OF MARCH 3, 1921, 41 STAT. L., 1313.)

*To all whom it may concern:*

Be it known that I, ADOLPHE KÉGRESSE, a citizen of the Republic of France, residing at Imperial Garage, Czarskoie Selo, Russia, have invented certain new and useful Improvements in Automobile-Sleigh Suspensions, of which the following is a specification.

The automobile-sleigh driven by an endless belt and forming the subject-matter of the U. S. Letters Patent No. 1,096,815 previously granted to me is provided with a suspension, the end parts of which are connected together by two special tension rods, and with a single pair of rollers, distributing the load over the lower stretch of the endless belt. In this case only one of the two pulleys supporting the belt is a driving pulley. On the other hand, in the construction forming the subject-matter of the above mentioned patent the forward part of the machine is supported by an arrangement representing a combination of wheels and slides.

The present invention relates to a modification of the above construction, its main features being as follows:—

(1) The arrangement of a suspension consisting of two separate and identical groups, arranged symmetrically in relation to the axle, around which each of these groups can rotate independently of one another.

(2) A symmetrical increase of the number of rollers in proportion to the weight of the machine, with the preservation of the same principle of distribution of the load, owing to which fact the running of the vehicle improves especially on an undulating running surface or track, when the driving stretch of the belt under better conditions adjusts itself to all the unevennesses of the surface.

(3) The use of a device for automatic tightening of the belt in proportion to the load.

(4) The arrangement of special members for taking up the side pressure of the driving mechanism on the rear axle, owing to which the axle, the suspension and the driving mechanism are relieved when the vehicle is turning or diverging in its course.

(5) The application of a similar mechanism with an endless belt in front of the vehicle instead of a combination of wheels and slides.

In the annexed drawings illustrating various embodiments of my invention, Figure 1 is a side view of the rear driving mechanism with four rollers, the right hand connecting lever between the belt pulley and corresponding rollers being shown in section; Fig. 2 is a plan view of the same mechanism with the upper stretch of the belt omitted and one of the groups of rollers shown in horizontal section; Figs. 3 and 4 show diagrammatically two embodiments of the invention with six and eight rollers, respectively; Fig. 5 is a diagrammatic view of the motor sleigh provided with a mechanism having an endless belt on the forward and rear axles, illustrated as traveling over an indulating track.

The load P on the axle 1 is not transmitted on one spring only, as is the case in the said previous patent, but on two separate springs 2 mounted freely on the axle 1 by means of straps 3 and arranged symmetrically in respect of the longitudinal axis of the mechanism. Each end of both springs rests on a suitably selected point 4 of the lever 5 connecting the driving pulley 6 with the beam 7 pairing the rollers 8. The position of the bearing point 4 determines the part of the load upon the rollers 8 and driving pulleys 6. If this point is, for instance, on the continuation of the axis of the vertical arm of levers 5, then the whole weight of the machine is supported by the rollers 8, while the pulleys 6 will rest on the ground only owing to their own weight. The trunnions 9 of the rollers 8 are supported by the ends of the beams with the aid of bearings having spherical surfaces. The lower part of the levers 5 is also rotatively connected with the free axle 10, connecting the two beams 7. In this way the rollers 8 and levers 7 form a linked quadrilateral system, owing to which fact the pressing rollers can stand small unevennesses of the ground in the side direction without causing harmful strain to the mechanism. In the longitudinal direction all the unevennesses of the road are taken up by the belt as in the arrangement described in the said previous patent, but with much greater accuracy in view of the increase of the number of rollers.

The transmission of movement to the vehicle is carried out, for instance, with the aid of pulleys 6, on each of which a sprocket wheel 16 is fastened, obtaining movement by means of an endless chain 17 from the sprocket wheels 18 on the axle 1.

The chains 17 may be replaced with a stiff or semi-stiff transmission by means of a shaft and bevel or helical wheels, fastened, on one side, on the axle 1 of the vehicle and on the driving pulleys on the other side.

The automatic tension of the belt in proportion to the load being carried is attained by means of tension rods 11, connecting the driving pulleys 6 with the axle 1. When the load increases the camber 12 showing the bend of the spring decreases and the axle 1, drawing the upper ends of the tension rods 11 with it, descends, in view of which fact the broken line formed by these rods tends to straighten out into a horizontal line and thus increases the distance between the axles of the pulleys 6.

Two rollers 13 loosely mounted on the inner side of the tension rods and capable of rolling between the guiding arc-shaped frames 14, fastened rigidly to the body 15 of the vehicle, are provided for taking up the side pressure and relieving the rear moving mechanism when the vehicle is turning in its course.

The arrangements with six and eight rollers shown in Figs. 3 and 4 are built on the same principle. It is also possible in very heavy vehicles to use, in case of need, ten, twelve and even more rollers.

The use of a similar mechanism with an endless belt in front of the automobile, instead of ordinary wheels or a combination of wheels and slides does not present any difficulty, as all the parts are fastened on the end of the axle itself. In this case a driving mechanism with complete adherency is obtained, i. e. with two driving axles; it is necessary, however, to replace the rollers 13 and guides 14 with rods connected to the steering mechanism.

The belt is preferably provided with a central guide rib according to which the pulleys 6 and rollers 8 have grooves to receive this rib.

What I claim is:—

1. In a motor vehicle driven by endless belts with load distributing rollers, a suspension system comprising in combination, a center axle, a load distributing and endless belt driving group arranged symmetrically at each side of the axle, a separate tension rod for pivoting each group to the said axle, a pair of load transmitting springs centrally attached to the axle, and a lever extending between each endless belt driving and load distributing group and on which lever the free ends of the said springs rest.

2. In a motor car driven by endless belts with load distributing rollers, a suspension system comprising in combination a center axle, endless belt driving mechanism symmetrically disposed on each side of the axle, a load distributing roller frame also symmetrically disposed on each side of the axle, arms connecting the load distributing roller frame to each of the driving mechanisms, a tension rod to enable each endless driving and load distributing device to pivot relatively to one another on each side of the axle and a pair of load transmitting springs centrally attached to the axle, the free ends of the springs resting upon the arm connecting the driving mechanism and load distributing devices at each side.

3. In a motor car driven by endless belts with load distributing rollers, a suspension system comprising in combination a center axle, an endless belt driving mechanism and a load distributing roller mechanism both disposed on each side of the axle, means whereby each group may rotate around the center axle independently of the other and a pair of load distributing transmitting springs centrally attached to the axle and whose ends control the movements of the belt driving and load distributing devices hereinbefore specified.

4. In a motor car driven by endless belts with load distributing rollers, an endless belt driving element, a load distributing quadrilateral roller frame hinged to the endless belt driving mechanism, tension rods extending between the center axle and the axle of the driving mechanism and a pair of load transmitting springs centrally attached to the axle and controlling the movements of the driving element and load distributing frame hereinbefore specified.

5. In a motor car driven by endless belts with load distributing rollers, a suspension system comprising in combination a center axle, endless belt driving mechanism symmetrically disposed on each side of the axle, a load distributing frame connected with the axle of each driving mechanism, rollers mounted in the load distributing frame and engaging with the lower stretch of the endless belt, beams centrally disposed of the load distributing frame, a connection between said beam and the axle of its adjacent belt driving mechanism, a pair of load distributing springs centrally attached to the axle and whose free ends rest upon the said connections extending between the load distributing frame and the driving mechanism.

6. In a motor car driven by endless belts with load distributing rollers, a suspension system comprising in combination a center axle, an endless belt driving mechanism arranged symmetrically on each side of the center axle, a load distributing frame on each side of the axle, a beam in said frame, a connection from each beam to the adjacent endless belt driving mechanism, a pair of load supporting springs centrally attached to the axle and whose free ends rest at a determined point upon the said connections, rollers in the load distributing frame, bearings on the beams having spherical surfaces for supporting the said rollers so that the rollers and beams form a linked quadrilateral system.

7. In a motor car driven by endless belts with load distributing rollers, a suspension system comprising in combination a center driven axle, endless belt supporting mechanism symmetrically disposed on each side of the axle, means on each of the said driving mechanism so that it is rotated from the center axle, a load distributing frame on each side of the axle, a beam in said frame, a connection from each beam to the adjacent endless belt driving mechanism, a pair of load supporting springs centrally attached to the axle and whose free ends rest at a determined point upon the said connections, rollers in the load distributing frame, bearings on the beam having spherical surfaces supporting the said rollers so that the rollers and beams form a linked quadrilateral system.

8. In a motor car driven endless belts with load distributing rollers, a suspension system comprising in combination a center driven axle, endless belt driving mechanism disposed symmetrically at each side of the said axle, a pair of tension rods each pivoted at one end of the center axle and fastened at their other ends to each belt driving mechanism to enable each driving mechanism to swing independently of the other, a load distributing frame on each side of the axle, a beam in said frame, a connection from each beam to the adjacent endless belt driving mechanism, a pair of load supporting springs centrally attached to the axle and whose free ends rest at a determined point upon the said connections, rollers in the load distributing frame, bearings on the beams having spherical surfaces for supporting the said rollers so that the rollers and beams form a linked quadrilateral system.

9. In a motor car, a suspension and driving system comprising a pair of sprockets spaced apart, an endless belt passing over each sprocket, an axle centrally disposed between the sprockets, a tension bar extending on each side from the center axle and engaging at its opposite end with each of the said sprockets, a load supporting frame disposed symmetrically on each side of the center axle, connections extending from the load supporting frame to the axle of its adjacent belt driving mechanism, rollers on the load distributing frame rotating in connection with the back of the lower stretch of the endless driving belt, a pair of load transmitting springs centrally attached to the central axle and whose free ends rest on a determined point of the said connections, whereby the driving mechanism and the load distributing group at one side of the center axle may move relatively to a similar group on the other side of the axle and means for the automatic tension of the belt in proportion to the weight being carried in such a manner that the greater the load on the driving axle, the greater will be the distance between the said sprockets.

10. In a motor car driven by endless belts with load distributing rollers, a suspension system comprising a center axle, a driving and load distributing group symmetrically disposed on each side of the said axle, a pair of load supporting springs centrally attached to the axle and whose free ends engage with one of the groups aforesaid to control the movement thereof, a pair of tension rods each pivoted at one end upon the center axle and connected at each of their other ends to one of the groups, rollers rotatably mounted on the inner side of said tension rods and fixed arc-shaped guides to engage the said rollers, whereby the turning of the vehicle in its course of travel will be rendered easier.

In witness whereof I have hereunto set my hand in presence of two witnesses.

ADOLPHE KÉGRESSE.

Witnesses:
H. A. LOVIAGUINE,
P. LOVIAGHIN.